United States Patent
Helmsen et al.

(10) Patent No.: US 9,360,127 B2
(45) Date of Patent: Jun. 7, 2016

(54) CONTROL VALVE

(75) Inventors: Frank Helmsen, Peine (DE); Tobias Kirchner, Vordorf (DE)

(73) Assignee: PROTEGO (USA), Inc., Charleston, SC (US)

( * ) Notice: Subject to any disclaimer, the term of this patent is extended or adjusted under 35 U.S.C. 154(b) by 6 days.

(21) Appl. No.: 13/883,299

(22) PCT Filed: Oct. 25, 2011

(86) PCT No.: PCT/EP2011/005372
§ 371 (c)(1),
(2), (4) Date: May 3, 2013

(87) PCT Pub. No.: WO2012/059190
PCT Pub. Date: May 10, 2012

(65) Prior Publication Data
US 2013/0213497 A1    Aug. 22, 2013

(30) Foreign Application Priority Data
Nov. 3, 2010 (EP) ..................................... 10014257

(51) Int. Cl.
*F16K 17/20* (2006.01)
*F16K 17/12* (2006.01)
*F16K 1/36* (2006.01)
*F16K 1/44* (2006.01)

(52) U.S. Cl.
CPC . *F16K 17/12* (2013.01); *F16K 1/36* (2013.01); *F16K 1/44* (2013.01); *Y10T 137/7909* (2015.04)

(58) Field of Classification Search
CPC ............. F16K 17/18; F16K 1/44; F16K 1/36; Y10T 137/7909
USPC ................................................... 137/469, 471
See application file for complete search history.

(56) References Cited

U.S. PATENT DOCUMENTS

| | | | | |
|---|---|---|---|---|
| 2,813,539 | A | * | 11/1957 | Farris .............................. 137/469 |
| 3,131,720 | A | * | 5/1964 | Horvath .................... 137/543.23 |
| 3,945,607 | A | * | 3/1976 | Dashner ......................... 251/357 |
| 4,676,266 | A | * | 6/1987 | Johnson .................. F16K 17/04 137/242 |
| 4,770,204 | A | * | 9/1988 | Schmitt et al. ................. 137/469 |
| 4,799,506 | A | * | 1/1989 | Taylor ............................ 137/469 |

(Continued)

FOREIGN PATENT DOCUMENTS

| | | |
|---|---|---|
| BE | 1005430 A4 | 7/1993 |
| CN | 2081021 U | 7/1991 |

(Continued)

*Primary Examiner* — John K Fristoe, Jr.
*Assistant Examiner* — Umashankar Venkatesan
(74) *Attorney, Agent, or Firm* — Witham, Curtis & Cook, P.C.

(57) ABSTRACT

The invention relates to a control valve having a valve seat and a valve disk (1), which can be moved from a closed position, in which the valve disk (1) rests on the valve seat and the relief valve is closed, into a through-flow position, in which the relief valve is open, wherein the valve disk (1) comprises a valve disk surface (2) having a peripheral surface rim (4) and a normal which is perpendicular to the valve disk surface (2), runs through the center of gravity of the latter and defines a longitudinal axis L. A brim is arranged on the surface rim (4), wherein said brim has a first part (6) which projects beyond the valve disk surface (2) in the axial direction with respect to the longitudinal axis L and has a second part (8) which adjoins the first part (6) and comprises a section that is radial with respect to the longitudinal axis L.

14 Claims, 7 Drawing Sheets

(56) References Cited

U.S. PATENT DOCUMENTS

| | | | |
|---|---|---|---|
| 4,932,434 A * | 6/1990 | Taylor | 137/469 |
| 5,094,266 A * | 3/1992 | Ledbetter | 137/469 |
| 5,165,444 A | 11/1992 | Dean | |
| 5,782,259 A * | 7/1998 | Ledbetter et al. | 137/71 |
| 7,383,855 B2 * | 6/2008 | Rogers | F16K 17/19 |
| | | | 137/493.8 |
| 7,552,744 B2 * | 6/2009 | Brill et al. | 137/516.27 |

FOREIGN PATENT DOCUMENTS

| | | |
|---|---|---|
| CN | 2108213 U | 6/1992 |
| CN | 1064141 A | 9/1992 |
| CN | 2541695 Y | 3/2003 |
| CN | 101160485 A | 4/2008 |
| CN | 201487369 U | 5/2010 |
| DE | 1033474 B | 7/1958 |
| DE | 1600894 A1 | 4/1970 |
| DE | 2950414 A1 | 6/1982 |
| DE | 3738071 A1 | 5/1988 |
| DE | 102006038740 A1 | 2/2008 |
| EP | 0972726 A1 | 1/2000 |
| EP | 1211447 A2 | 6/2002 |
| EP | 1462694 A1 | 9/2004 |
| FR | 2552846 A1 | 4/1985 |
| JP | 2007517170 A | 6/2007 |
| WO | 8907324 A1 | 8/1989 |
| WO | 2007/101901 A1 | 9/2007 |

\* cited by examiner

CONTROL VALVE

The invention refers to a switch valve with a valve seat and a valve plate that can be moved from a closed position, in which the valve plate is in contact with the valve seat and the pressure valve is closed, into a through-flow position, in which the pressure valve is open, wherein the valve plate comprises a valve plate surface with a circumferential surface edge and a perpendicular, which runs vertically to the valve plate surface and through the valve plate surface's centre of gravity and defines a longitudinal axis, wherein a brim is arranged at the surface edge, the brim comprising a first part which protrudes from the valve plate surface in an axial direction relative to the longitudinal axis.

Switch valves act as pressure or vacuum valves and serve to aerate and ventilate containers as soon as the pressure inside exceeds or falls below a predetermined response pressure. The functioning principle of a pressure or vacuum valve does not differ in this matter. The valve plate is moved into the through-flow position as soon as a force acting on the valve plate, caused by a difference in pressure on either side of the valve plate, is greater than a closing force and acts in the opposite direction of the closing force.

In the following, a pressure valve is described. However, the statements made apply to vacuum valves in the same way.

Process media, such as liquids or gases, are often stored in containers in which the pressure is not allowed to exceed a predetermined value. Therefore, the container has a release opening that is closed by a pressure valve with a valve plate. Here, the valve plate closes the opening with the valve plate surface that is arranged on the valve seat. The pressure of the process medium in the container thus has an effect directly on the valve plate surface, for example. Should the pressure on the valve plate surface reach a predetermined response pressure, the valve plate is moved and thereby frees the release opening. The objective is thus to lead a volume flow out of a container if a predetermined response pressure is reached inside the container. For this purpose, the valves ideally cannot be opened or closed using a controlled additional force, but rather are only opened and closed by the pressure in the container or the process medium flowing out when the valve is open. To achieve this, valve plates of this type must ideally fulfil several criteria.

A deciding criterion is the flow rate, i.e. the amount of the discharged process medium per time unit. Should the pressure within the container reach the predetermined response pressure, the valve should open and let a sufficient amount of the process medium escape from the container as quickly as possible, in order to allow the pressure inside the container to decrease again. A higher flow rate can be achieved either by having a greater nominal diameter of the valve casing, so that the entire valve and thereby the valve plate are made bigger, or by a larger stroke of the valve plate. Moreover, with a larger stroke, the release opening through which the process medium flows out of is enlarged, thus increasing the discharged volume flow and the flow rate. In contrast to making the stroke of the valve plate bigger, the enlargement of the casing, and thereby the whole valve, is coupled with a considerable increase in production costs. It is therefore practical to begin by maximising the stroke of the valve plate with a constant normal casing diameter before enlarging the normal diameter of the casing.

If the pressure inside the container reaches and then exceeds the response pressure, the valve plate should reach the largest possible stroke as quickly as possible, in order to make the full flow rate available as quickly as possible. In the prior art, the so-called "10% technology" has been established for normal valves. With this type of technology, the valve plate has reached the full stroke when the pressure in the container is 10% higher than the response pressure. In order to guarantee this, a force must act on the valve plate across the entire stroke path; this force moves the plate away from the valve seat and therefore from the container, and is greater than the closing force of the valve plate. The closing force with weight-loaded valve plates is only equal to the weight force of the valve plate. However, spring loaded valve plates are known whereby the closing force, alongside the weight force of the valve plate, is also a spring force acting on the valve plate. Of course other forces acting on the valve plate are also conceivable. The quicker the valve plate reaches the full stroke once the response pressure has been reached or exceeded, the longer the operator can maintain the pressure inside a container, such as a tank, because the valve has already reached the full stroke with a relatively small increase in pressure, for example 10%, and therefore allows for the maximum flow rate. As a result, the losses in process medium are reduced, thus protecting the environment.

Alongside the large flow rate and the fact that the full stroke is reached quickly, a low "blow down" is generally required. This means that the valve should close again as quickly as possible once the pressure inside the container, such as a tank, has again fallen below the response pressure. Once the valve has opened fully, a equalizing of pressure takes places. By equalizing the pressure, the pressure inside the container is reduced, so that the pressure acting on the raised valve cap, caused by the process medium flowing out of the valve, decreases over time. Sooner or later the force acting on the valve cap, caused by the process media flowing out of the valve, will be smaller than the closing force of the valve plate. At this point the valve begins to close. The pressure in the container at which this closure takes place is called closing pressure. The difference between the response pressure and the closing pressure is called blow down. In order to achieve a low blow down, i.e. a valve closure as close as possible to the response pressure, the flow force acting on the valve plate, created by the process medium leaving the valve at the response pressure, and across the whole stroke path must not be much greater than the closing force of the valve. Moreover, a low blow down leads to a reduction in losses in process medium and protects the environment.

These three criteria are not generally very compatible because the ideal valve plate has a large stroke and the flow force acting on the valve plate, created by the process medium flowing out of the valve must be in a tight range across the whole stroke area. First of all, the flow force acting on the valve plate, created by the process media flowing out of the valve, must be greater than the closing force of the valve plate, yet it must not be much greater than the closing force, in order to achieve a low blow down.

Pressure valves with different valve plate shapes are known from the prior art. For example, square brims or tapered brims are used. For this purpose, the valve plate comprises a valve plate surface that has a circumferential surface edge. A brim, such as a square brim or a tapered brim, is arranged on this surface edge. Should the valve plate be raised upwards when the valve is being opened, the brim stretches downwards around the valve seat. For this, a square brim comprises a first part of the brim, primarily horizontally arranged, that consequently stretches parallel to the valve plate surface. At the outer edge of this first part a second part of the brim is located, which is primarily arranged vertically downwards. Should the valve plate now be raised during opening, the process medium flows upwards out of the valve seat and strikes the valve plate surface. At this point it is deflected sideways until it strikes the second part of the brim, which is arranged vertically downwards. At this point the process medium is deflected again so that it leaves the valve plate in a downward direction. Due to the fact that a horizontally arranged first part of the brim is initially provided, the surface that is struck by the process medium flowing out of the valve is initially considerably enlarged, especially with small strokes. This results in a peak in the flow force, particularly in the lower stroke range. Consequently the valve plate quickly achieves the full stroke, thus providing the maximum flow rate. However, at the same time the flow force acting on the valve plate created by the process medium flowing out of the valve is much greater than the closing force of the valve plate, resulting in a very high blow down.

The same applies to a tapered brim, whereby the brim on the circumferential surface edge of the valve plate surface runs diagonally downwards. Even with very small strokes, the valve plate surface that is struck also increases in size, resulting in a peak in the flow force.

If the entire valve plate surface and the brim are struck by the process media flowing out of the valve, the surface struck in the upper stroke range does not change. The throttle effect of the annular gap between the valve plate and the valve seat is reduced by means of the larger valve opening. The valve is often located in a casing whose exit slit is now the opening to be throttled. As a result, the pressure inside the casing increases and the difference in pressure above and below the valve plate decreases, causing the force acting on the valve plate to also decrease. In addition, the entire process medium leaving the valve no longer strikes the valve plate, thereby reducing the total force exerted by the flow acting on the valve plate.

The invention thus aims to propose a pressure valve with which all three required criteria can be met more effectively.

The invention solves the problem at hand by means of a pressure valve according to the preamble with a valve plate whose brim has a second part that extends from the first part, the second part comprising a radial section relative to the longitudinal axis. This means that the radial section of the second part of the brim has a larger proportion extending in a radial direction than extending in an axial direction, relative to the longitudinal axis. It has been proven to be preferable if the angle between the radial section and the valve plate surface is a maximum of 30°: a maximum of 25° is preferable and especially preferable is a maximum angle of 20°. Here, the angle is, for example, larger than 0°, preferably larger than 5° and especially preferable is an angle greater than 10°.

This special arrangement of the first part and the second part of the brim connected to it has several advantages. First of all, the first part of the brim can be designed to be relatively small, for example less than 10%, preferably less than 8% and especially preferably less than 6% of the diameter of the valve seat. This ensures that the process medium flowing out of the valve seat with small strokes is deflected onto the valve plate surface with the first part of the brim connected to it. This means that a force can be exerted upwards on the valve plate, whilst a sufficiently large volume flow can be simultaneously discharged. This arrangement of the second part of the brim ensures that the process medium flowing out of the valve that is deflected during the use of small strokes does not strike the second part of the brim. The result is that the surface struck by the process medium flowing out of the valve during the use of small strokes does not increase in size, so that a peak in the flow force does not occur. The force acting on the valve plate created by the process medium flowing out of the valve is therefore still greater than the closing force which, for example, can be the weight force of the valve plate and if necessary, an additional force, such as a spring force, causing the valve plate to be pushed further upwards. However, this force is not as great as with brim shapes from the prior art, so the valve plate closes again when there is a relatively low decrease in pressure in the container. This ensures a low blow down.

Should the stroke height of the valve plate increase, the second part of the brim, which stretches in a radial direction relative to the longitudinal axis, is struck directly by the process medium leaving the valve seat. As a result, the surface that is struck now increases in size, so that the force acting on the valve plate created by the process medium flowing out of the valve increases. This ensures that the force acting on the valve plate is greater than the closing force of the valve in this stroke range as well, pushing the valve plate further away from the valve plate. The described effect of the reduction in total force exerted by the flow acting on the valve plate is thus reduced at large strokes.

With a brim arrangement according to the invention, the force exerted by the flow of the process medium flowing out of the valve at small strokes acts only on the valve plate surface itself. In this stroke range, the second part of the brim has no effect due to the radial section. In particular, no other force, caused by the process medium flowing in, is exerted on the valve plate. The second part of the brim is only struck directly by the process medium flowing in when larger strokes are used, resulting in an additional proportion of the force exerted by the flow being transferred to the brim and thereby the valve plate. This ensures that the total force acting on the valve plate only varies by a small amount, ideally not at all, across the entire stroke range. The total force is thereby is kept within a relatively small range above the response pressure across the entire stroke range, so that the full stroke is reached quickly, consequently achieving the full total flow rate quickly as well. A low blow down is also achieved. It has been proven to be advantageous if a force of 15%, preferably 20%, and especially preferably 25 or 30% of the full stroke, i.e. of the maximum deviation of the valve plate away from a valve seat, is exerted on the valve plate by the process medium striking the second part of the brim.

The second part of the brim preferably has a brim edge that faces away from the first part of the brim, which protrudes above the radial section of the second part of the brim relative to the longitudinal axis in an axial direction. This arrangement ensures that the force transferred to the brim when larger strokes are being used, which means that the second part of the brim is directly struck by the process medium flowing out the valve, is sufficient to move the valve plate further away from the valve seat. Should the valve plate surface be arranged horizontally and the valve seat arranged below this valve plate surface, the brim edge of the second part of the brim is arched downwards, for example. As a result, the process medium flowing out of the valve that strikes the second part of the brim is further deflected, so that, on the one hand, the flow direction of the medium is changed more dramatically, and on the other hand, a greater force is exerted on the second part of the brim and thus on the entire valve plate.

The first part of the brim stretches, for example, at an angle of at least 0°, preferably at least 5°, especially preferably at least 10° and a maximum of 25°, preferably a maximum of 20°, especially preferably a maximum of 15° towards the longitudinal axis. Due to the fact that the first part of the brim is inclined slightly towards the longitudinal axis, it is possible to influence the direction in which the process medium leaves the valve. In addition, the force exerted on the valve plate by the process medium flowing out of the valve is also influenced as a result. In this way it is therefore possible to individually set the flow direction, as well as the force exerted on the valve plate.

The first part of the brim preferably comprises at least one gap. This ensures that, even when the smallest strokes are being used, a sufficiently large volume flow can be discharged. Furthermore the process medium flowing out of the valve is sufficiently deflected, so that a sufficiently great force is exerted on the valve plate.

The second part of the brim is arranged in the shape of a wing panel in a radial section relative to the longitudinal axis. With small strokes, a second part of the brim arranged in this way has a very small or no influence on the process medium that flows out of the valve and is deflected onto the valve plate. Only when large strokes are used does the process medium flow around both sides of the second part of a brim arranged in this way, as a part of the process medium flowing out of the valve directly strikes the underside of the second part and another part flows along the upper side of the second part through the at least one recess in the first part of the brim. The wing panel shaped arrangement of this second part of the brim creates a vacuum above the second part, resulting here in a lift. Consequently this arrangement also supplies an additional force on the brim, when larger strokes are used, and thus also on the valve plate, whilst the second part of the brim has largely no effect when small strokes are used.

The valve plate surface is preferably designed to be circular.

The pressure valve is preferably designed in such a way that the valve plate is only held by the weight force acting on it in the closed position and is only moved out of the closed position by the pressure acting on the valve plate surface.

In addition, the brim of the valve plate may have further radial and/or axial sections. This enables a further fine tuning of the force acting on the valve plate. Of course, diagonal sections or sections with arched cross sections are also conceivable.

With the aid of a drawing an embodiment of the present invention will be explained in more detail, What is shown is.

Figure 1:
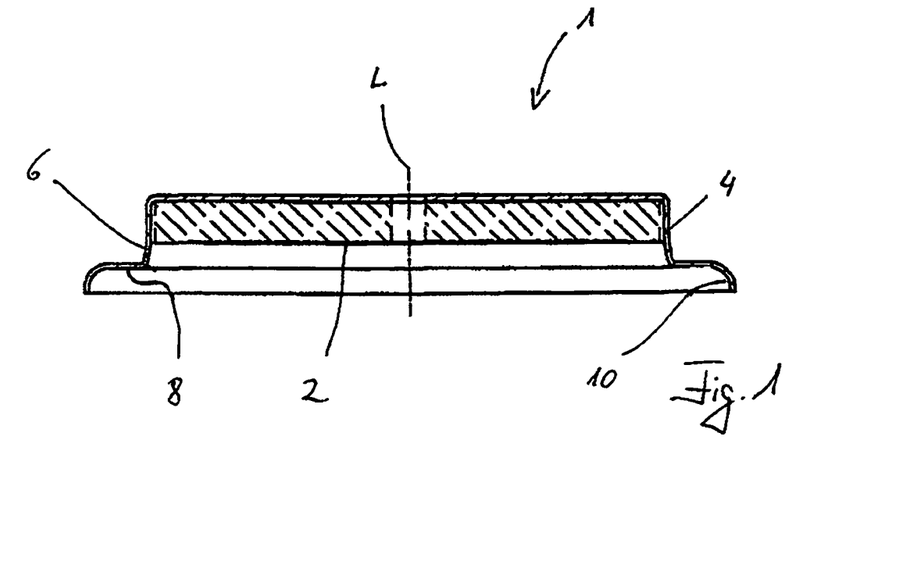
FIG. 1—a valve plate of a pressure valve according to an embodiment of the present invention in a sectional view, FIG. 2—a valve plate of a pressure valve according to a second embodiment of the present invention in a sectional view, FIG. 3—the valve plate from FIG. 2 in a 3D view, FIG. 4a-d—a switch valve according to an embodiment of the present invention in the open state at different widths, and FIG. 5a-d—a switch valve of another embodiment of the present invention in the open state at different strokes.

FIG. 1 shows a valve plate 1 in a sectional view. The valve plate 1 has a valve plate surface 2 by means of which the valve plate 1 lies on top of a valve seat, not shown in FIG. 1, when the valve is closed. In FIG. 1 a longitudinal axis L is shown by a dotted line, which is positioned vertically on the valve plate surface 2. The valve plate surface 2 comprises a circumferential surface edge 4 upon which a first part 6 of a brim is arranged, which protrudes above the valve plate surface 2 in the axial direction. A second part 8 of the brim is located on this first part 6 of the brim, which comprises a circumferential brim edge 10 that faces away from the first part 6 of the brim.

In the arrangement shown in FIG. 1, a valve plate 1 is placed onto a valve seat, located below the valve plate, that is opened upwards. For this purpose, the valve plate is not opened or closed by means of a controlled additional force, but rather the embodiment shown in FIG. 1 is weight-loaded. The valve seat comprises an opening in a container not shown in FIG. 1, such as a tank. The process medium inside the container pushes the valve plate surface 2 from below in the orientation shown in FIG. 1. Should the pressure exceed a pre-set response pressure, the valve plate 1 is raised. Since the first part 6 of the brim, arranged in the axial direction relative to the longitudinal axis L, is relatively small, the process medium flowing out of the valve is deflected by the valve plate 1 and the first part 6 of the brim, and leaves the valve plate 1 in a downward direction. For this purpose, the horizontally arranged radial section of the second part 8 in FIG. 1 ensures that neither the second part 8 nor the brim edge 10 located on it has an influence on the process medium flowing out of the valve. Only at larger strokes the process medium flowing out also strikes the second part 8 of the brim, causing an additional force to act on the valve plate 1. The medium is deflected by the brim edge 10, which is arched downwards, causing the force exerted on the valve plate 1 to increase in comparison to a straight brim edge 10.

This arrangement of the valve plate ensures that the force acting on the valve plate 1 across the entire stroke path is greater than a closing force of the valve plate 1, but exceeding it only by a small amount. In this way, alongside the rapid attainment of the maximum stroke and the resulting rapidly occurring maximum flow rate, a low blow down is achieved.

Figure 2:
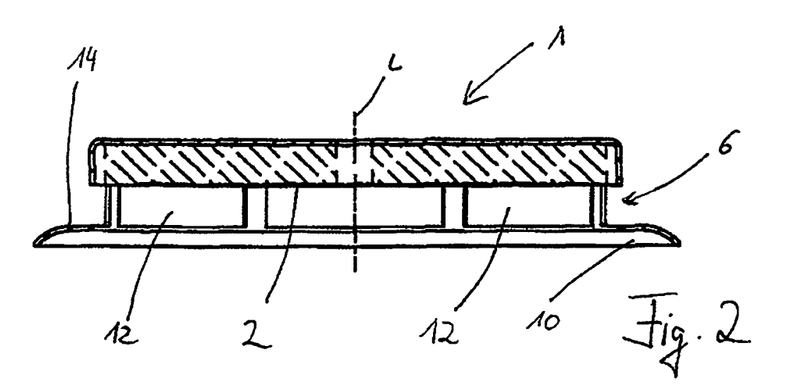

FIG. 2 shows a valve plate 1 according to a second embodiment of the present invention. It also comprises a valve plate surface 2 in which a longitudinal axis L is depicted as a dotted line. The first part 6 of the brim has gaps 12 in FIG. 2, through which the process medium flowing out of a valve seat can leave the valve plate. To this effect, at small strokes, the process medium only flows above an upper side 14 of a second part 8 of the brim. With small strokes, the second part 8 of the brim consequently has a very small or no influence at all on the process medium flowing out of the valve.

With larger strokes, the second part 8 of the brim is also struck directly, so that the process medium flows along the upper side 14 of the second part 8 of the brim, as well as the lower side.

The second part 8 has a cross section in the shape of a wing panel, so that a vacuum is created above the upper side 14 of the second part 8 by the fundamentally horizontal striking of the upper side 14 and the lower side of the second part 8. This generates a lift that moves the valve plate 1 further upwards.

Figure 3:
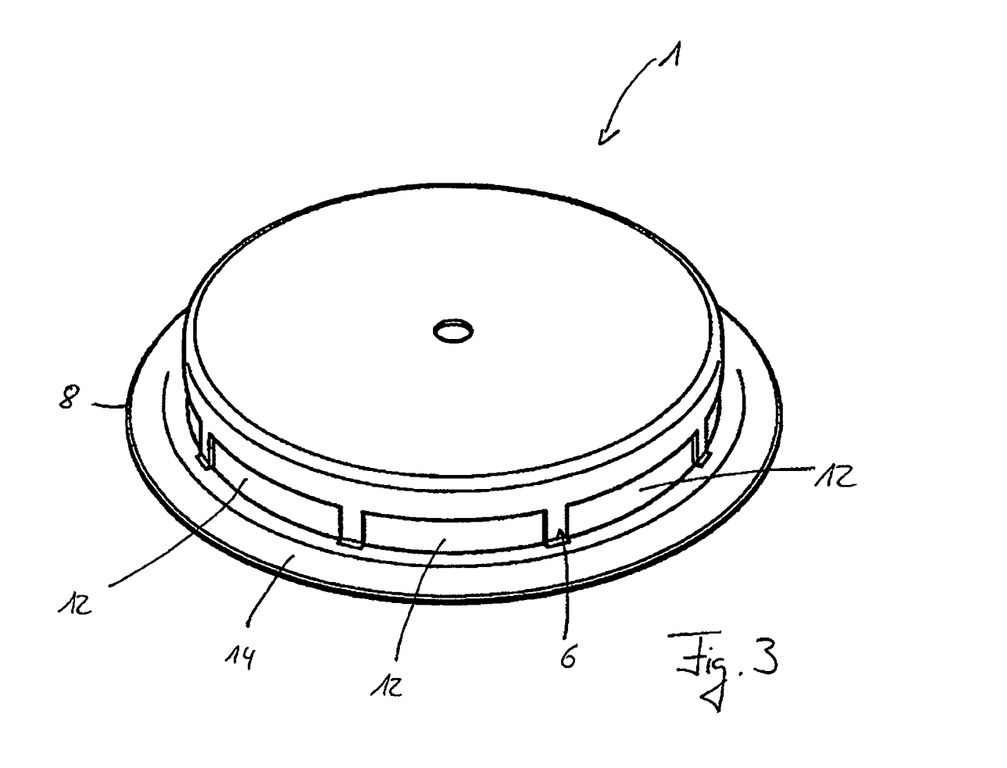

FIG. 3 shows the valve plate 3 from FIG. 2 in a three-dimensional view. The gaps 12 in the first part 6 of the brim can be clearly recognised, through which the process medium leaving the valve flows out over the upper side 14 of the second part 8 of the brim. Therefore, the valve plate shown in FIGS. 2 and 3 ensures that different forces act on the valve plate 1, depending on the stroke of the valve plate, thereby keeping the total force within a relatively small range above the response pressure.

FIGS. 4a to 4d show a switch valve according to an embodiment of the present invention in an open state at different strokes. The valve comprises a first connection opening 16 and a second connection opening 18. Should the switch valve shown be used as a pressure valve, a predetermined pressure inside a container must not be exceeded. In this case, the container is connected to the first connection opening 16. Should the pressure rise above the predetermined response pressure, the valve plate 1 is raised and the valve opened. The medium can then leave the container, enter through the first connection opening 16 in the valve and leave the valve through the second connection opening 18.

However, should the switch valve be used as a vacuum valve, the pressure in a container must not fall below a predetermined pressure. This container is then connected to the second connection opening 18. Should the pressure in the container fall below the predetermined response pressure, the valve plate 1 is sucked upwards by the vacuum that occurs in the area above the valve plate 1 and the valve is opened. In this case, the medium can enter the valve through the first connection opening 16 and leave the valve through the second connection opening 18, thereby reaching the container, where a pressure equalization occurs.

Figure 4A:
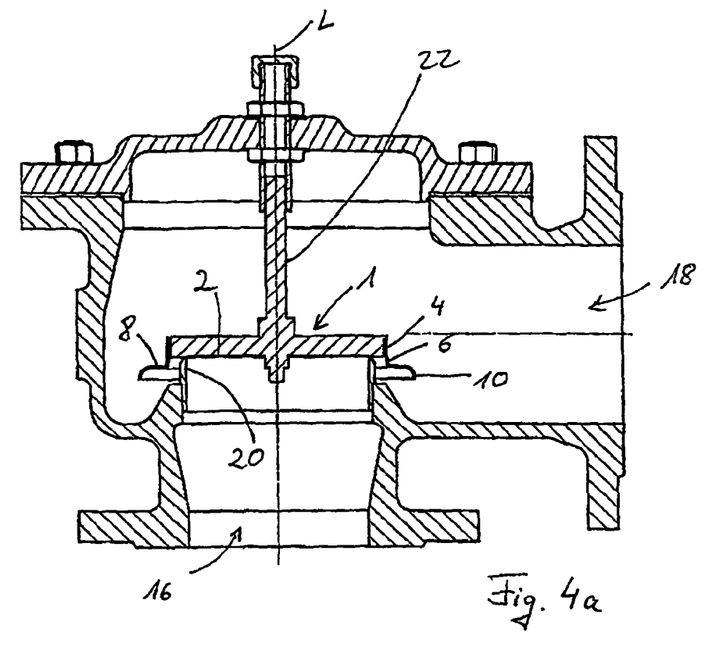

The switch valve shown in FIGS. 4a to 4d comprises a valve seat 20 which the valve plate 1 lies on top of with the valve plate surface 2 when the valve is closed. This position is shown in FIG. 4a. With its valve plate surface 2, the valve plate 1 lies on the valve seat 20 of the switch valve, thereby preventing the flow of a substance from the first connection opening 16 to the second connection opening 18 of the switch valve.

Figure 4B:
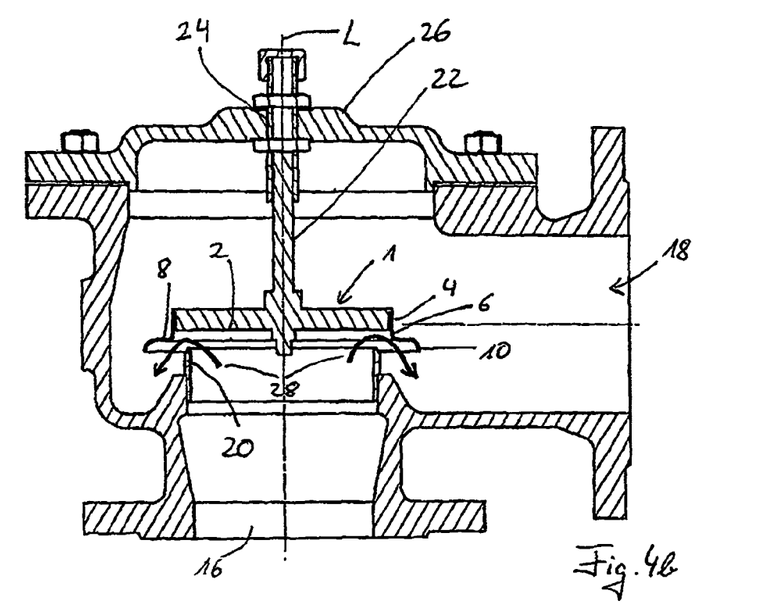

FIG. 4b shows the switch valve from FIG. 4a when it is slightly opened. It is clear to see that the valve plate 1 with the valve plate surface 2 no longer lies on the valve seat 20 of the switch valve. A substance can now flow through the valve seat 20 of the switch valve from the first connection opening 16 to the second connection opening 18. Here, the process medium flows through the first connection opening 16 and strikes the valve plate surface 2 of the valve plate 1, causing the valve plate to move along its longitudinal axis L.

For this purpose, a lead 22 is arranged on the upper side of the valve plate 1, which is guided by means of a recess 24 in an upper part 26 the switch valve casing. The process medium that flows out of the first connection opening 16 through the valve seat 20 towards the valve plate surface 2 of the valve plate 1 is deflected downwards onto a first part of the brim 6 before it leaves the switch valve through the second connection opening 18. The direction of flow of the process medium is depicted by the arrows 28 in FIG. 4b. It can be recognised that when the switch valve is open in this way, the second part of the brim 8 and the arched brim edge 10 have no influence on the process medium flowing along the arrows 28.

Figure 4C:
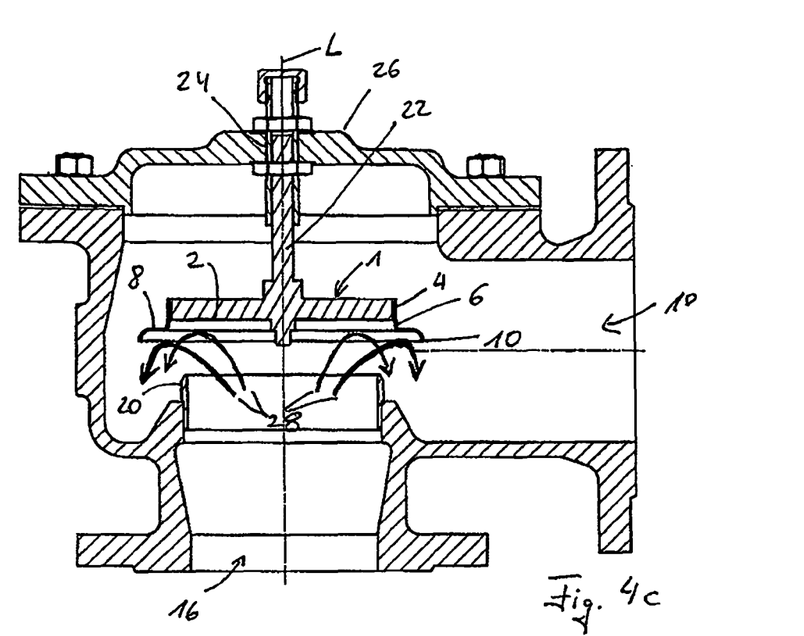

FIG. 4c shows the switch valve from the FIGS. 4a and 4b in another opened state. The valve plate 1 with its valve plate surface 2 is now located further away from the valve seat 20 in comparison to the situation depicted in FIG. 4b. The direction of flow of the process medium, which flows through the valve seat 20 from the first connection opening 16 to the second connection opening 18 of the switch valve, is again represented by arrows 28. It can be recognised that a part of the process medium flows further down towards the valve plate surface 2 and is deflected downwards onto the first part of the brim 6. However, another part of the process medium now strikes the second part of the brim 8 and is also deflected downwards by the brim edge 10, which is arched downwards, before it can leave the switch valve through the second connection opening 18. Consequently, in this stage of the valve opening a force is transferred onto the valve plate 1 by a process medium flowing onto the second part of the brim 8, pushing the valve plate further upwards. Not until this stage of valve opening does the second part of the brim 8 with the brim edge 10 have an influence on the direction of flow of the process medium flowing out of the valve, by means of which the additional force acting upwards is created. This extra force is necessary to open the switch valve as quickly as possible, i.e. to bring the valve plate 1 to full stroke.

Figure 4D:
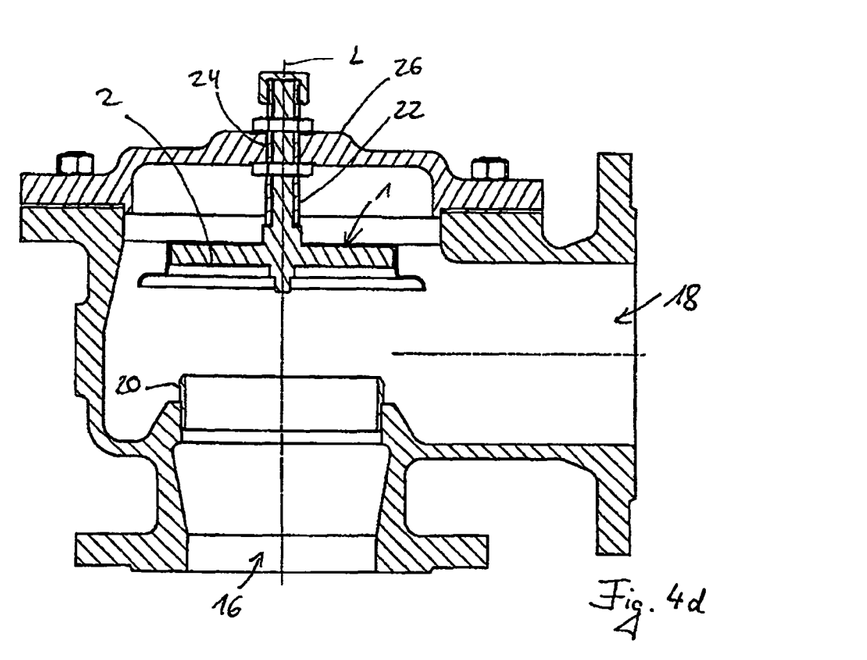

FIG. 4d shows the situation in which the valve plate 1 is raised by the maximum amount, i.e. at the full stroke. The process medium flowing through the valve seat 20 from the first connection opening 16 to the second connection opening 18 still strikes the valve plate surface 2 from below and thereby pushes the valve plate 1 further upwards. This happens until the pressure in a container, arranged on the second connection opening 18, is above a predetermined response pressure, if the switch valve is being used as a pressure valve. Therefore, the size which is essential to switch the valve is the difference between the pressure on the first connection opening 16 and the pressures on the second connection opening 18. Only when this difference in pressure falls below a certain value is the force exerted on the valve plate 1 by the process medium flowing through the valve enough to hold the valve plate 1 in its raised through-flow position, which is why in this case, the valve plate 1 moves downwards again and the valve closes.

The FIGS. 5a to 5d show the situations of the switch valve depicted in in FIGS. 4a to 4d; however, the switch valve shown in FIGS. 5a to 5d has a different valve plate 1.

Figure 5A:
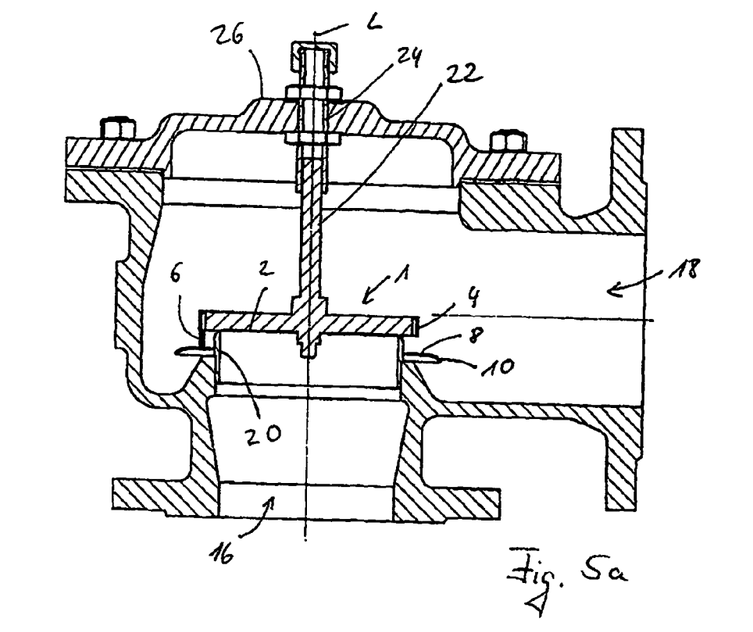
Figure 5B:
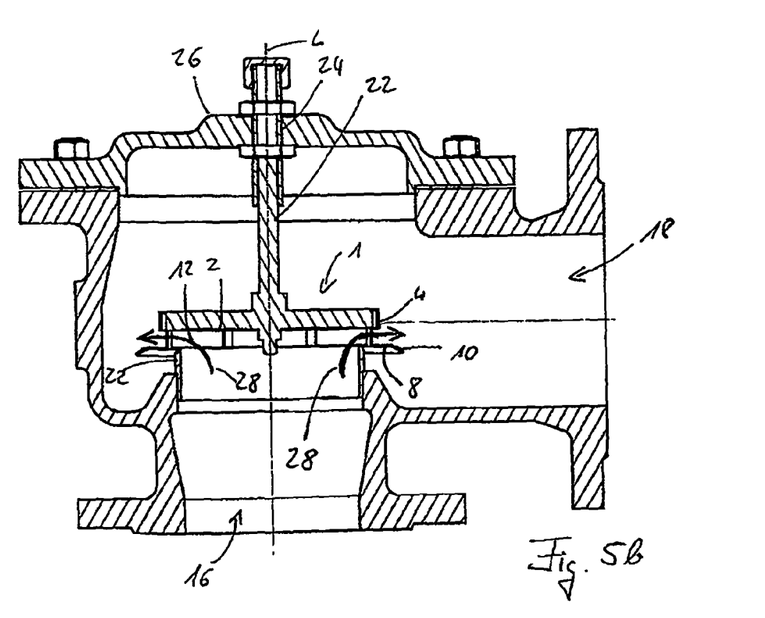
Figure 5C:
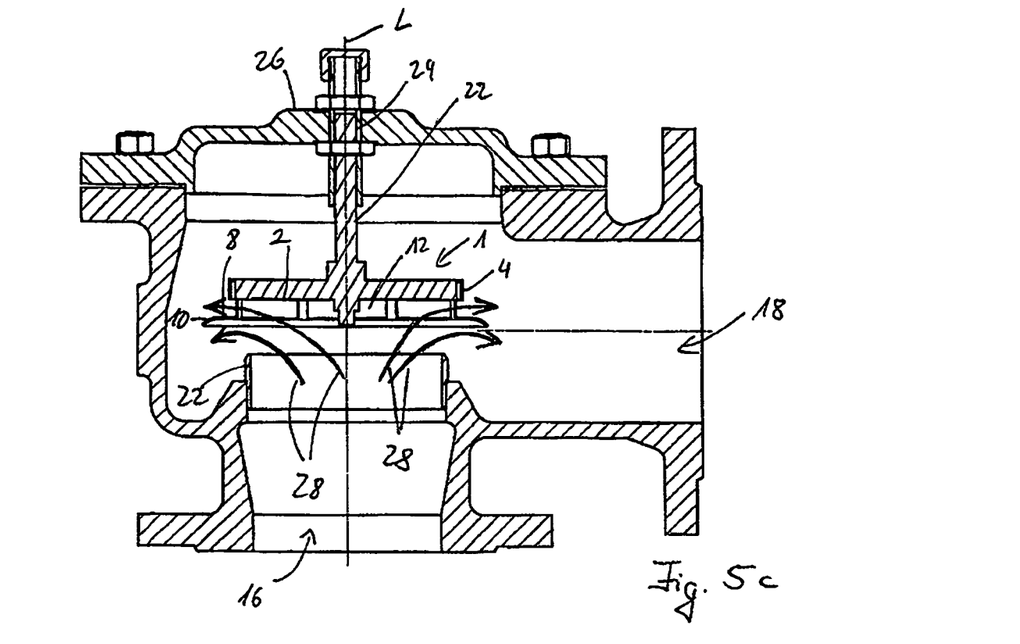
Figure 5D:
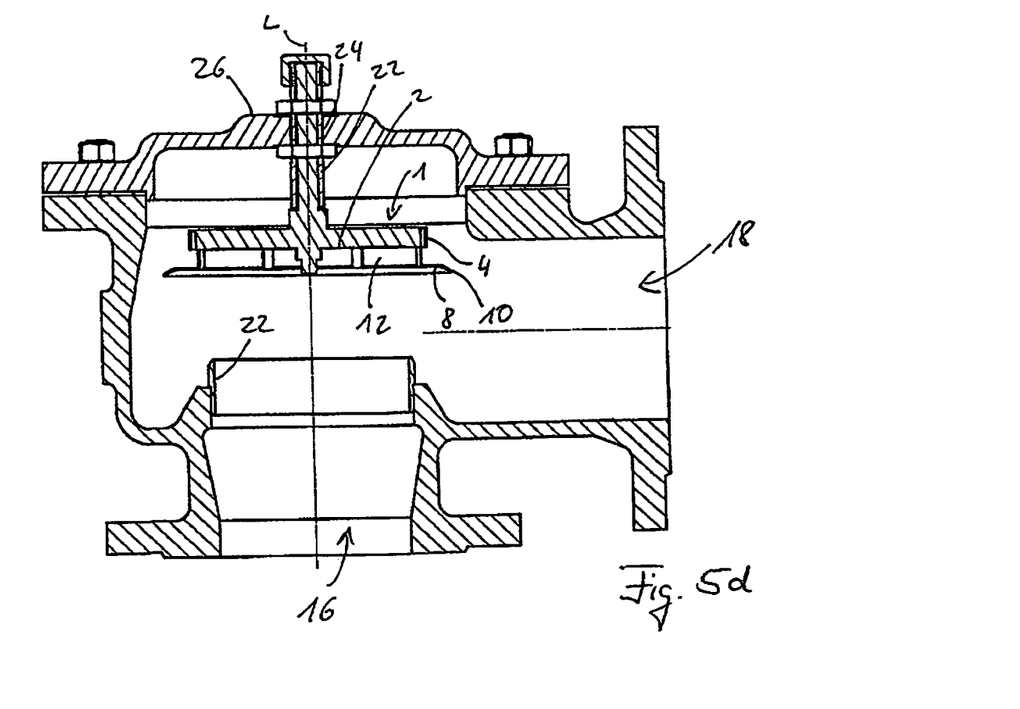

The embodiment of a switch valve shown in FIGS. 5a and 5d has a valve plate 1, as it is depicted in FIG. 2, for example. FIG. 5a shows the situation in which the switch valve is closed. The valve plate 1 lies with its valve plate surface 2 on top of the valve seat 20 of the switch valve, so that the valve is closed.

FIG. 5b shows the position in which the valve plate 1 has already been slightly raised by means of a difference in pressure between the pressure on the first connection opening 16 and the pressure of a second connection opening 18. The valve plate 1 no longer lies with its valve plate surface 2 on top of the valve seat 22. In FIGS. 5a to 5d the valve plate 1 can also be moved along its longitudinal axis L. A lead 22 is also provided here, which is guided by a recess 24 of an upper part 26 of the valve casing.

In the switch valve shown in FIGS. 5a to 5d, the valve plate 1 comprises a first part of the brim 6, which is provided with gaps 12. FIG. 2b shows the situation in which the valve plate 1 is raised precisely so high that a process medium can flow from the first connection opening 16 to the second connection opening 18 by flowing through these gaps 12. The direction of flow of this process medium is also represented by arrows 28 in FIG. 5b. In the situation shown in FIG. 5b, the process medium flowing through the valve strikes the valve plate surface 2 of the valve plate 1 from below and is deflected so that it can flow in the horizontal direction through the gaps 12 in the first part of the brim 6 in FIG. 5b. Due to the fact that the process medium is deflected on the valve plate surface 2, a force is exerted on the valve plate 1 that pushes it further upwards.

This situation is shown in FIG. 5c. In comparison to the situation shown in FIG. 5b, the valve plate 1 is located further away from the valve seat 22. The process medium flowing through the valve from the first connection opening 16 to the second connection opening 18 again strikes the valve plate surface 2 at least partially from below. Here, it is deflected and leaves the valve plate 1 in an almost horizontal direction through the gaps 12 in the first part of the brim 6. Another part of the process medium does not strike the actual valve plate surface 2, but rather strikes the second part of the brim 8 from below and is deflected here and on the brim edge 10, which is arched downwards. The direction of flow of the process medium is also represented by arrows 28 in FIG. 5c.

As can be clearly recognised in FIG. 5c, the process medium flows around the second part of the brim 8 with the brim edge 10 on two sides, namely above and below the second part of the brim 8. In a preferred embodiment of the invention, this second part of the brim 8 in the section shown in FIGS. 5a to 5d is preferably wing panel shaped. In this arrangement, the fact that the process medium flowing through the valve flows around the second part of the brim 8 on two sides causes a lift, by means of which the valve plate 1 is moved further upwards.

FIG. 5d shows the valve from FIGS. 5a to 5c, where the valve plate 1 is in the full stroke position. The valve plate 1 is therefore moved upwards by the maximum amount and the valve opened to the maximum. In this state, a part of the process medium flowing from the first connection opening 16 to the second connection opening 18 also strikes the valve plate surface 2 from below and is deflected. As a result a force is again exerted on the valve plate 1, which pushes upwards. The process medium flowing through the valve also flows around the second part of the brim 8 with the brim edge 10, above as well as below the second part of the brim 8, again creating a lift by means of which the valve plate 1 is further kept in its maximum through-flow position. Only when the difference in pressure between the pressure on the first connection opening 16 and the pressure on the second connection opening 18 falls below a predetermined response pressure is the force acting on the valve plate 1, caused by the process medium flowing through the valve, no longer great enough to keep the valve plate 1 in its through-flow position. The valve plate 1 then moves downwards along the lead 22 and the longitudinal axis L and the valve closes again.

REFERENCE NUMERALS LIST

L Longitudinal axis
1 Valve plate
2 Valve plate surface
4 Surface edge
6 First part of the brim
8 Second part of the brim
10 Brim edge
12 Gap
14 Upper side
16 First connection opening
18 Second connection opening
20 Valve seat
22 Lead
24 Recess
26 Upper part
28 Arrow

The invention claimed is:

1. A switch valve with a valve seat and a valve plate that can be moved from a closed position, in which the valve plate is in contact with the valve seat and the switch valve is closed, into a through-flow position, in which the switch valve is open,
wherein the valve plate comprises
a valve plate surface with a circumferential surface edge, wherein said valve plate surface is the surface by means of which the valve plate lies on top of the valve seat when the valve is closed, and
a perpendicular, which runs vertically to the valve plate surface and through a center of gravity of the valve plate surface, said perpendicular defining a longitudinal axis L, and
wherein a brim is arranged at the circumferential surface edge, wherein the brim comprises
a first part which protrudes from the circumferential surface edge in a downward direction from the valve plate surface and
a second part comprising a radial section extending in the radial direction that extends from the first part, the second part further comprising a brim edge extending in the axial direction from the radial section relative to the longitudinal axis L, wherein the radial section has a larger proportion extending in the radial direction than the brim edge extending in the axial direction, the entire radial section being larger than the valve seat diameter.

2. The switch valve according to claim 1 wherein the first part of the brim stretches at an angle towards the longitudinal axis L.

3. The switch valve according to claim 1 wherein the first part of the brim has at least one gap.

4. A switch valve with a valve seat and a valve plate that can be moved from a closed position, in which the valve plate is in contact with the valve seat and the switch valve is closed, into a through-flow position, in which the switch valve is open,
wherein the valve plate comprises
a valve plate surface with a circumferential surface edge, wherein said valve plate surface is the surface by means of which the valve plate lies on top of the valve seat when the valve is closed, and
a perpendicular, which runs vertically to the valve plate surface and through a centre of gravity of the valve plate surface, said perpendicular defining a longitudinal axis L, and
wherein a brim is arranged at the circumferential surface edge, wherein the brim comprises
a first part which protrudes from the valve plate surface towards the valve seat in an axial direction relative to the longitudinal axis L, and
a second part that extends from the first part, the second part comprising a radial section relative to the longitudinal axis L,
wherein the first part of the brim has at least one gap, and
wherein the second part of the brim has a cross section in the shape of a wing panel with respect to a radial section relative to the longitudinal axis L, wherein said shape of a wing panel is a shape sufficient to create a vacuum above said second part of the brim.

5. The switch valve according to claim 1 wherein the valve plate surface is circular.

6. The switch valve according to claim 1 wherein the switch valve is configured so that the valve plate is only held in the closed position by the weight force acting on it and is only moved out of the closed position by pressure acting on the valve plate surface.

7. The switch valve according to claim 2 wherein the angle ranges from 10 to 15 degrees.

8. The switch valve according to claim 2 wherein the angle ranges from 5 to 25 degrees.

9. The switch valve according to claim 1, wherein the switch valve is configured so that at a first stroke height the second part of the brim is not struck by process medium while the first part of the brim is struck by process medium, and at a second stroke height the second part of the brim is struck by process medium, wherein the second stroke height is larger than the first stroke height.

10. The switch valve according to claim 1, wherein the switch valve is configured so that process medium strikes the second part of the brim exerting a force thereon for 15 to 30% of a full stroke, wherein the full stroke is a maximum deviation of the valve plate away from the valve seat.

11. The switch valve according to claim 1, wherein a tangent line at any point of the first part of the brim as applied to a cross-sectional profile of the switch valve has an angle of at least 0 degrees and no more than 25 degrees relative to the longitudinal axis L.

12. The switch valve according to claim 1, wherein the radial section has a non-zero angle of 30 degrees or less with respect to the valve plate surface.

13. The switch valve according to claim 1, wherein the radial section is horizontal.

14. The switch valve according to claim 1, wherein the brim edge arches downwards with a negative concavity.

\* \* \* \* \*